UNITED STATES PATENT OFFICE.

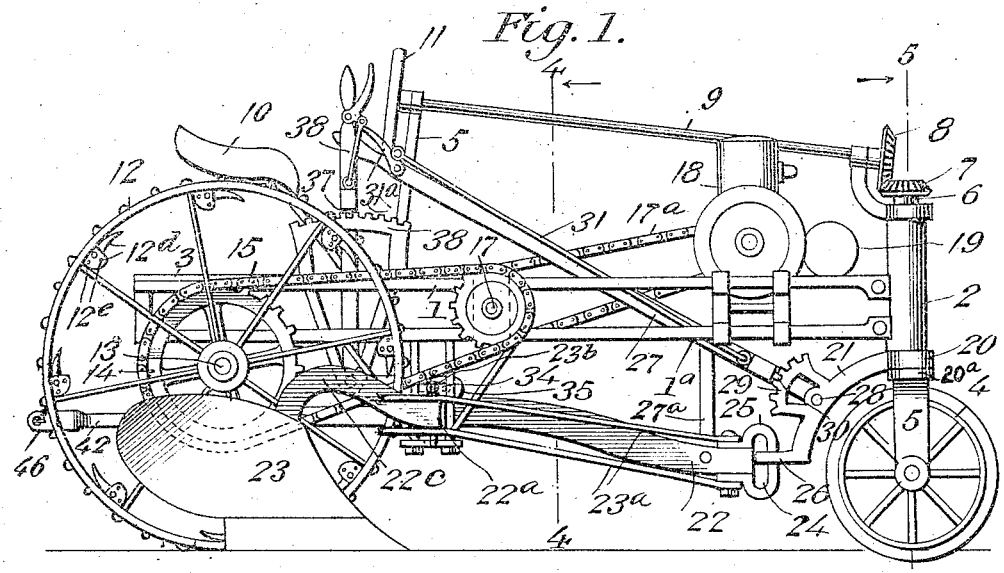
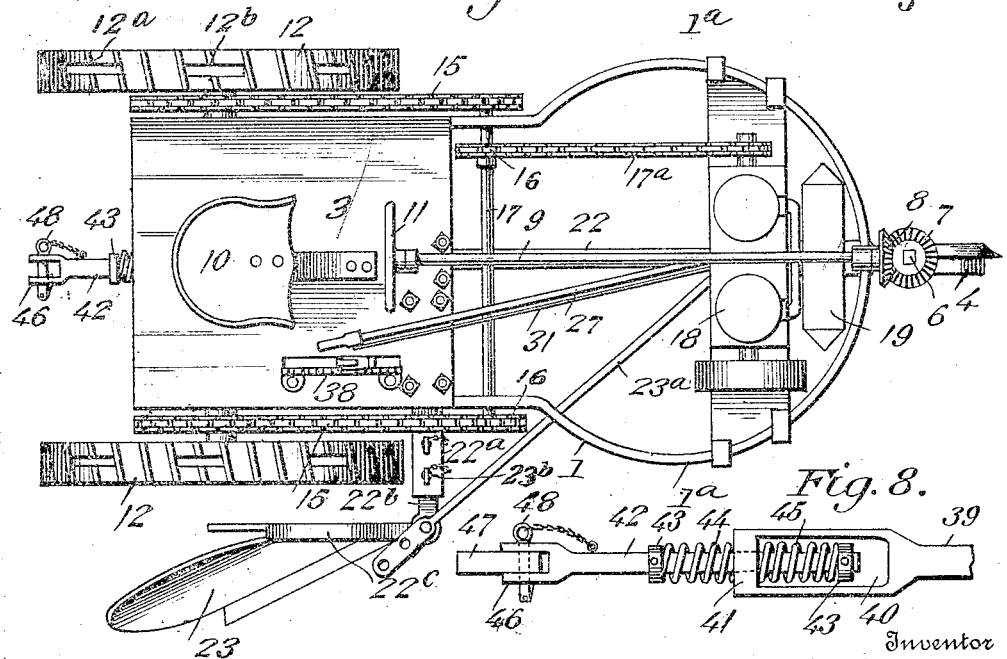

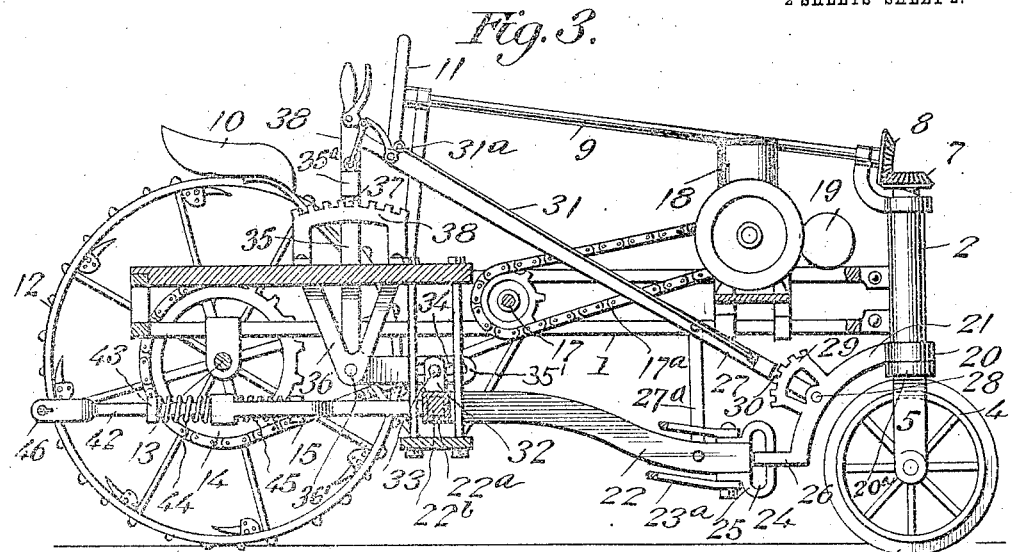
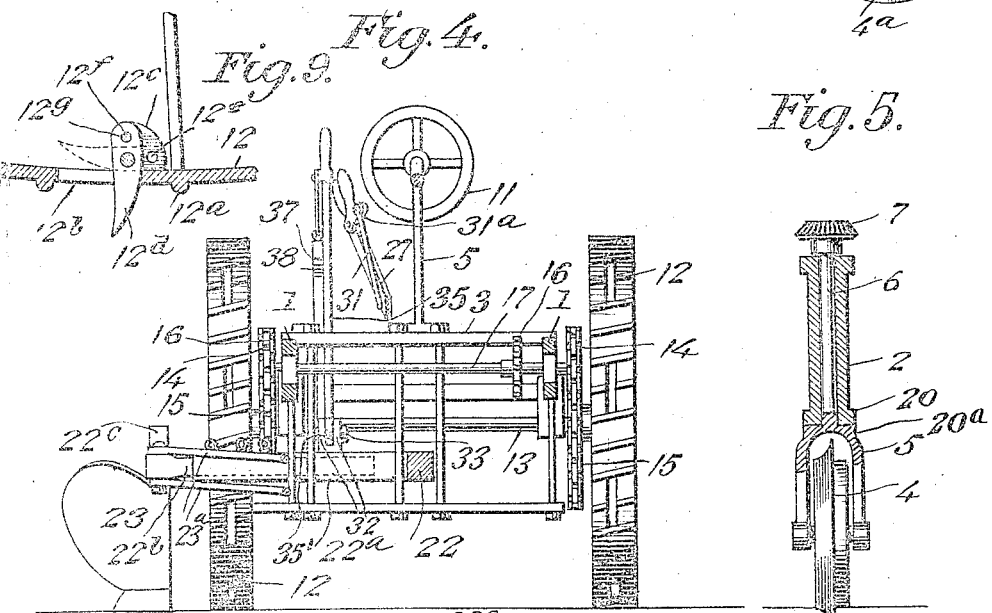
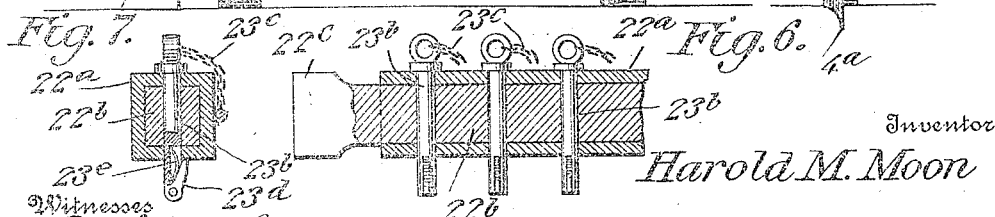

HAROLD M. MOON, OF ARKANSAS CITY, KANSAS.

MOTOR-PLOW.

1,059,897.   Specification of Letters Patent.   Patented Apr. 22, 1913.

Application filed September 23, 1911. Serial No. 650,885.

*To all whom it may concern:*

Be it known that I, HAROLD M. MOON, a citizen of the United States, residing at Arkansas City, in the county of Cowley and State of Kansas, have invented new and useful Improvements in Motor-Plows, of which the following is a specification.

This invention relates to a motor driven plow, the object of the invention being to provide a plow of this character which is simple, strong, light and durable in construction and inexpensive of production, which is driven by a gasolene engine and gearing capable of being easily controlled and reversed to reverse the motion of the implement when required, and which embodies a plow beam and share susceptible of ready adjustment to regulate the depth of penetration of the share and to raise the same clear of the ground in turning or transporting the implement from place to place.

A further object of the invention is to provide a motor plow having a strong and durable type of frame to support the motor and operating parts, and embodying steering gear, whereby the implement may be turned within its own length; to provide means whereby a vehicle may be coupled to and drawn by the plow without being subjected to objectionable shocks and jars; to provide means whereby the share may be conveniently applied and detached; to provide means for preventing or reducing side draft; and to provide improved ground gripping devices for the driving which can be adjusted for use or retracted at will.

The invention consists of the features of construction, combination and arrangement of parts, hereinafter fully described and claimed, reference being had to the accompanying drawings, in which:—

Figure 1 is a side elevation of a motor plow constructed in accordance with my invention. Fig. 2 is a top plan view of the same. Fig. 3 is a vertical longitudinal section through the plow. Fig. 4 is a vertical transverse section on line 4—4 of Fig. 1. Fig. 5 is a detail sectional view on line 5—5 of Fig. 1. Fig. 6 is a longitudinal section through the share coupling. Fig. 7 is a transverse section thereof. Fig. 8 is a plan view of the draw-bar and coöperating parts. Fig. 9 is a detail section through one of the rear driving and supporting wheels.

Referring to the drawings, 1 designates a substantially circular or elliptical supporting frame, the curved sides $1^a$ of which are provided at their forward ends with a vertical bearing sleeve 2 and are connected at their ends with a body or platform 3. The forward end of the frame is carried by a supporting and steering wheel 4 journaled in a fork 5 upon the lower end of a steering post 6 journaled in the bearing 2. The upper end of the post 6 carries a gear 7 meshing with a gear 8 on the forward end of a steering rod 9, the rear end of which is suitably journaled upon the body 1 in proximity to the operator's seat 10 and carries a hand wheel 11. By turning the rod 9 in one direction or the other, rotary motion may be imparted to the steering post 6 to steer the implement to the right or left, as will be readily understood. The wheel 4 is provided with a flange $4^a$ concaved on one side to a cutting edge to enter the ground and prevent or reduce side draft, the opposite side of the wheel presenting a square or flat bearing surface on the same side as the share, to adapt the wheel to effectually hold the implement from turning under the resistance of the share.

The implement is supported at its rear end upon spurred supporting and driving wheels 12 rigidly mounted on a transverse axle 13 journaled in bearings carried by the body 3, which rests thereon. Each wheel 12 may be provided with fixed gripping spurs $12^a$ and is formed in its rim with slots $12^b$. Pivoted to brackets $12^c$ on the inner face of the rim are gripping spurs $12^d$ which may be arranged to lie wholly on the inner side of the rim when not required for use, or may be projected through the slots so as to form gripping projections to enter the ground and prevent slipping of the wheels on muddy or icy roads. Each bracket has apertures $12^e$ to receive a pin $12^f$ adapted to be passed through an aperture $12^g$ in the tooth, whereby the latter may be fastened in either position. Secured to the wheels 12 or axle 13 are sprocket wheels 14 driven by chains 15 from sprocket wheels 16 on a transverse shaft 17 driven by a chain $17^a$ from the shaft of a driving motor 18, whereby the implement is propelled. The motor 18 is preferably a gasolene or internal combustion motor of the reversible type, supplied with gasolene from a storage tank 19 mounted upon the box or body or some suitable portion of the frame. Suitable controlling devices in practice lead from the motor to a position convenient to the operator's seat 10, whereby the operator may control the feed of the fuel mixture to the motor and reverse the motor whenever desired, thus permitting the operator to have complete control over the driving power. It will thus be understood that the implement may be quickly and conveniently stopped and reversed at will and its speed of motion regulated as circumstances require.

Fixed to or formed integral with the bearing sleeve 2 is a collar or head 20 resting on a shoulder 20ª formed on the fork 5, and fixed to and carried by said collar 20 is a downwardly and rearwardly curved bracket or hanger 21, to which is adjustably connected the forward end of a plow beam 22 having a laterally bent arm 22ª socketed to receive the laterally bent coupling arm 22ᵇ of a rearwardly extending standard 22ᶜ carrying a share 23.

As shown, the standard 22ᶜ is adjustably connected with the forward end of the beam by braces 23ª and said forward end of the beam is provided with a vertical slot 24 forming a rounded coupling member 25, which slot loosely receives a ring-shaped coupling member 26 embracing the member 25, whereby the said forward end of the beam is slidably and pivotally connected with the bracket 21 for vertical adjustment. The arms 22ª and 22ᵇ are apertured to receive coupling pins 23ᵇ, each secured at its upper end to said arm 22ª by a chain or flexible connection 23ᶜ and carrying at its lower end a pivoted latch 23ᵈ adapted to engage the underside of said arm 22ª to hold the pin from displacement. The latch is pressed outward by a leaf spring 23ᵉ seated in a socket in the pin, into which socket the latch is adapted to be folded to enable the pin to be withdrawn. An adjusting lever 27 is pivotally connected at its forward end with the bracket 21, as at 28, and with the beam 22 by a link 27ª, and its rear end terminates in a handle adjacent to the operator's seat, whereby the lever may be raised or lowered to raise or lower the front end of the plow beam. Carried by the bracket 21 is a segmental rack 29, the teeth of which are adapted to be engaged by a dog 30 connected by a link 31 with an operating handle 31ª, whereby the lever may be locked in adjusted position and released for adjustment in either direction.

The arm 22ª of the beam is provided with a pair of spaced upturned lugs 32 carrying a pin 33 engaging a slot 34 in the horizontal arm 35' of a bell-crank lever 35 fulcrumed upon a bracket 36, as at 36', the vertical arm 35ª of which lever is provided with a pawl 37 to engage a rack 38, whereby the rear end of the beam and the share attached thereto may be conveniently raised or lowered and locked in adjusted position.

Extending rearwardly from the beam 22 is a draft-bar 39 slotted at its rear end to form a guide opening 40 and cross piece 41. A draw-bar 42 is slidably mounted in said opening and cross-piece and is provided with collars 43 on opposite sides of the cross-piece forming abutments for springs 44 and 45, disposed between the same and said cross-piece for cushioning and taking up the shocks and jars from the pulling strains in both directions. The draw-bar has a forked rear end 46 to receive the tongue 47 of a wagon or other vehicle to be coupled to the plow, which may be fastened to the draw-bar by a coupling pin 48. When the implement is not needed for plowing the share may be detached in an obvious manner and the implement used as a traction engine for drawing a wagon or other purposes.

From the foregoing description, the construction and mode of operation of my improved motor plow will be readily understood without an extended description, and it will be seen that a strong and durable frame structure is provided to support the motor and working parts, and that by raising the front end of the plow beam and lowering the rear end of said beam the depth of penetration of the share may be regulated, while by elevating the rear end of the beam the penetrative depth may be graduated to a nicety and the plow raised just sufficiently to clear the ground during the turning of the implement. By raising both ends of the beam, the share may be elevated entirely to be conveniently transported from place to place. It will be seen that the share is arranged wholly at one side of the implement sufficiently beyond the adjacent wheel 12, whereby the wheels will run on the sod at one side of the furrow, the advantages of which will be apparent.

Having thus described the invention, what I claim as new is:

1. A motor plow comprising a supporting frame, supporting and driving wheels at the rear end of the frame, a yoke journaled upon the forward portion of the frame and carrying a steering wheel, means for turning said yoke and steering wheel, a bracket carried by the steering yoke and carrying a rack segment and a rearwardly projecting coupling member, a motor carried by the frame and in gear with said supporting and driving wheels, a beam provided at its forward end with a vertically slotted coupling member slidably and pivotally engaged with the coupling member on the bracket, a shank arranged beyond and parallel with one of the supporting and driving wheels and having an inwardly extending arm secured to the rear end of the beam, a share carried by said shank and arranged wholly to one side of the frame, a lever pivotally connected with the bracket and forward end of the beam and provided with a pawl to engage said rack segment, whereby the forward end of the beam may be raised on said coupling members, and means for elevating the rear end of the beam.

2. A motor plow comprising a supporting frame, supporting and driving wheels at the rear end of the frame, a steering wheel journaled at the forward end of the frame and carrying a bracket, a motor in gear with said supporting and driving wheels, a beam slidably and pivotally connected at its forward end with said bracket and provided at its rear end with a laterally extending socket, an adjusting device pivoted to the bracket and connected with the forward end of the beam whereby the latter may be raised or lowered, means for locking said adjusting device in adjusted position, means connected with the rear end of the beam for raising and lowering the same, a standard or shank arranged beyond and parallel with one of said supporting and driving wheels and having an inwardly extending arm fitted and secured in said socket, a plow share carried by said shank or standard and arranged wholly to one side of the frame, and braces between said shank or standard and the forward end of the beam.

3. A motor plow comprising a supporting frame, supporting and driving wheels at the rear end of the frame, a motor in gear with said supporting and driving wheels, a steering wheel journaled at the forward end of the frame and carrying a bracket, a beam slidably and pivotally connected at its forward end to the bracket and provided at its rear end with a laterally extending socket, means carried by said bracket and connected with the forward end of the beam for vertically adjusting the latter, means carried by the frame and connected with the rear end of the beam for vertically adjusting the latter, a plow share arranged wholly to one side of the frame and having a supporting standard fitted and secured within said socket, a draft bar connected with the rear end of the beam, a draw bar slidably mounted on said draft bar, and cushioning springs arranged to cushion the movements of said bar in opposite directions.

In testimony whereof I affix my signature in presence of two witnesses.

HAROLD M. MOON.

Witnesses:
   A. M. FARLEY,
   E. C. OVERHOLT.